(12) United States Patent  (10) Patent No.: US 8,192,072 B2
Truce et al.  (45) Date of Patent: Jun. 5, 2012

(54) PARTICLE INTERACTIONS IN A FLUID FLOW

(75) Inventors: Rodney John Truce, Sherwood (AU); John Walter Wilkins, Camp Hill (AU); Graham Jerrold Nathan, Learmonth Court (AU); Richard Malcolm Kelso, Walkerville (AU); Peter Anthony Markus Kalt, Kensington (AU)

(73) Assignee: Indigo Technologies Group Pty Ltd, Queensland (AU)

( * ) Notice: Subject to any disclaimer, the term of this patent is extended or adjusted under 35 U.S.C. 154(b) by 286 days.

(21) Appl. No.: 12/709,093

(22) Filed: Feb. 19, 2010

(65) Prior Publication Data

US 2010/0142314 A1    Jun. 10, 2010

Related U.S. Application Data

(62) Division of application No. 10/588,535, filed as application No. PCT/AU2005/000160 on Feb. 9, 2005, now abandoned.

(30) Foreign Application Priority Data

Feb. 9, 2004  (AU) ............................... 2004900593

(51) Int. Cl.
*B01F 5/00*    (2006.01)
(52) U.S. Cl. ........................................ 366/337; 366/340
(58) Field of Classification Search ............... 366/174.1, 366/337, 340, 181.5
See application file for complete search history.

(56) References Cited

U.S. PATENT DOCUMENTS

| | | | |
|---|---|---|---|
| 3,006,436 A | 10/1961 | Starbuck et al. | |
| 3,289,398 A | 12/1966 | McIlvaine | |
| 3,883,324 A | 5/1975 | Balla et al. | |
| 3,951,344 A | 4/1976 | Wilson | |
| 5,378,063 A | 1/1995 | Tsukada | |
| 5,456,533 A | 10/1995 | Streiff et al. | |
| 5,626,651 A | 5/1997 | Dullien | |
| 6,224,654 B1 | 5/2001 | Chawla | |
| 6,872,238 B1 | 3/2005 | Truce | |
| 2002/0085448 A1* | 7/2002 | Phillips | 366/181.5 |
| 2002/0175079 A1 | 11/2002 | Christel et al. | |
| 2006/0256649 A1 | 11/2006 | Truce et al. | |

FOREIGN PATENT DOCUMENTS

| | | |
|---|---|---|
| GB | 2087249 | 5/1982 |
| GB | 2133301 | 7/1984 |
| UA | SU1087184 A | 4/1984 |
| UA | SU1304883 A | 4/1987 |
| WO | 9429017 | 12/1994 |
| WO | 0134854 | 5/2001 |
| WO | 2004096420 | 11/2004 |

* cited by examiner

*Primary Examiner* — David Sorkin
(74) *Attorney, Agent, or Firm* — The Webb Law Firm

(57) ABSTRACT

Interaction between two different species of particles in a fluid stream is promoted by generating turbulent eddies in the fluid stream. The turbulent eddies are designed to be of such size and/or intensity that the two species of particles are entrained into the eddies to significantly different extents. Consequently, the different species of particles follow different trajectories, and the likelihood of collisions or interactions between the particles is increased. Optimum collision rates will occur for a system which maintains a Stokes Number (St) much less than 1 for one species, and or order 1 or greater for the other species. The invention has particular application in air pollution control, by promoting agglomeration of fine pollutant particles in air streams into larger particles to thereby facilitate their subsequent removal from the air streams.

17 Claims, 6 Drawing Sheets

PARTICLE INTERACTIONS IN A FLUID FLOW

Figure 1:
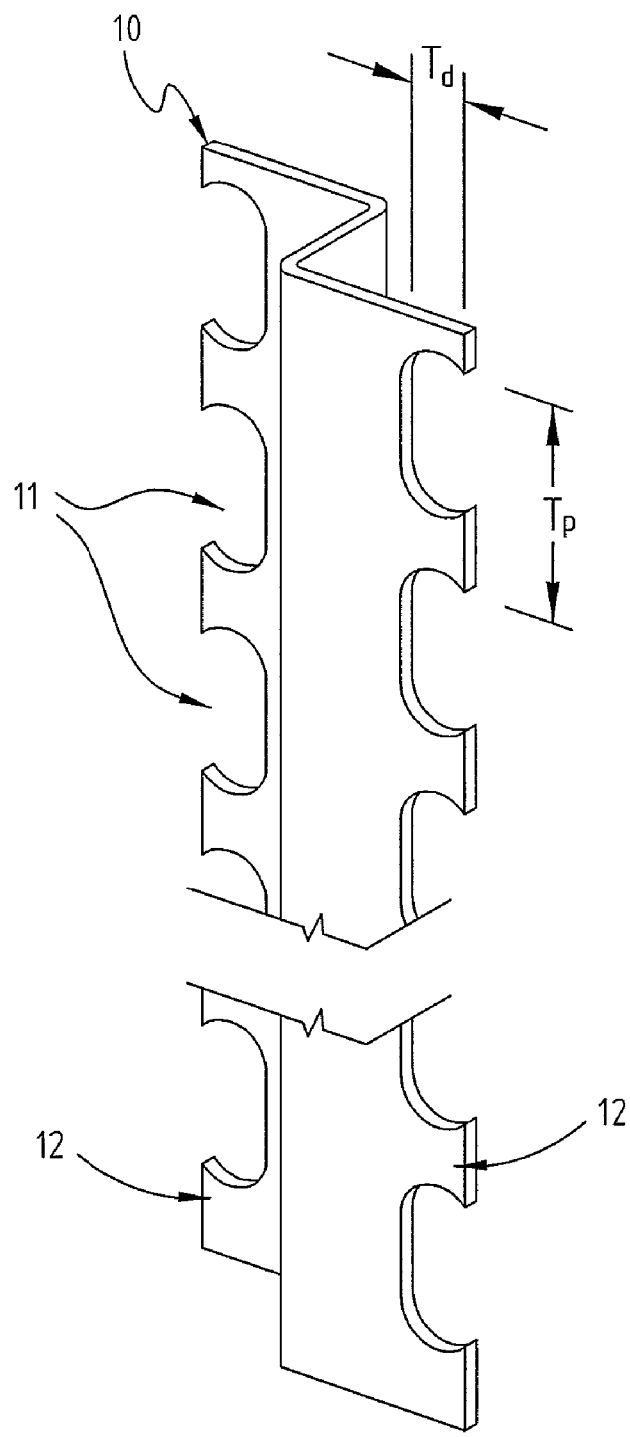

This invention relates generally to a method and apparatus for promoting or increasing interactions between different types of particles in a fluid flow. The invention provides a method of designing a formation of vortex generators to generate particle scale turbulence to cause interactions between particular types of particles in a fluid flow in a highly efficient manner.

The invention has particular application in air pollution control, by promoting agglomeration of fine pollutant particles in air streams into larger particles to thereby facilitate their subsequent filtration or other removal from the air streams, although the invention is not limited to that application.

BACKGROUND ART

Many industrial processes result in the emission of small hazardous particles into the atmosphere. These particles often include very fine sub-micron particles of toxic compounds which are easily inhaled. Their combination of toxicity and ease of respiration has prompted governments around the world to enact legislation for more stringent control of emission of particles less than ten microns in diameter (PM10), and particularly particles less than 2.5 microns (PM2.5).

Smaller particles in atmospheric emissions are also predominantly responsible for the adverse visual effects of air pollution. Opacity is largely determined by the fine particulate fraction of the emission since the light extinction coefficient peaks near the wavelength of light which is between 0.1 and 1 microns.

Various methods have been used to remove dust and other pollutant particles from air streams. Although these methods are generally suitable for removing larger particles from air streams, they are usually much less effective in filtering out smaller particles, particularly PM2.5 particles.

Fine particles in air streams can be made to agglomerate into larger particles by collision/adhesion, thereby facilitating subsequent removal of the particles by filtration. Our international patent applications nos. PCT/NZ00/00223 and PCT/AU2004/000546 disclose energized and passive devices for agglomerating particles. The agglomeration efficiency is dependent upon the incidence or frequency of collisions and similar interactions between the particles.

Many pollution control strategies also rely on contact between individual elements of specific species to promote a reaction or interaction beneficial to the subsequent removal of the pollutant concerned. For example, sorbents such as activated carbon can be injected into the polluted air stream to remove mercury (adsorption), or calcium can be injected to remove sulfur dioxide (chemisorption).

In order for these interactions to take place, the two species of interest must be brought into contact. For many industrial pollutants in standard flue ducts, this is difficult for several reasons. For example, the time frames for reaction/interaction are short (of the order of 0.5-1 second), the species of interest are spread very sparsely (relative to the bulk fluid) through the exhaust gases, and the scale of the flue ducting is large compared to the scale of the pollutant particles.

Normally, exhaust gases from the outlet of an industrial process are fed into a large duct which transports them to some downstream collection device (e.g. an electrostatic precipitator, bag filter, or cyclone collector) as uniformly and with as little turbulence/energy loss as possible. Such turbulence as is generated en route is normally a large scale diversion of gases around turning vanes, around internal duct supports/stiffeners, through diffusion screens and the like. This turbulence is of the scale of the duct and should desirably be the minimum disturbance, and hence pressure drop, possible to achieve the desired flow correction.

Similarly, when mixing devices are employed for a specific application, eg. sorption of a particular pollutant, they are usually devices that generate a large-scale turbulence field (of the order of the duct width or height) and are arranged as a short series of curtains that the gases must pass through.

The aim of most known mixing devices is to achieve a homogeneous mixture of two or more substances. Such devices are not specifically designed to promote interactions between fine particles in the mixture. In most industrial-scale devices involving the transport of particles, the turbulence generated by the mixing is of a large scale relative to the particles. Under such conditions the particles tend to travel in similar paths rather than in collision courses.

It is also known that vortex generators can be used in mixing chambers to promote mixing of fluids. However such devices are not generally used in particle laden flows to create collisions between particles.

Whether they be particulate (e.g. flyash), gaseous (e.g. $SO_2$), mist (e.g. $NO_x$), or elemental (eg. Mercury), the pollution species which are the more difficult to collect within industrial exhaust flues are those of the order of micrometers in diameter (i.e. $10^{-6}$ metres). Due to their small size, they occupy a very small volumetric proportion of the total fluid flow. For example, if uniformly distributed, one million 1 μm diameter particles would occupy less than 0.00005% of the volume of 1 $cm^3$ of gas (assuming that the particles are spherical). Even at 10 μm diameter, this proportion only increases to 0.05%. When it is considered that a pollutant such as Mercury may only account for a few parts per million (ppm) of the total species present, it is apparent that at particle scale, there is a significant amount of space/distance between the species being transported by an industrial flue gas. Where particles are already "well-mixed" in a flow, e.g. disbursed more-or-less randomly throughout a duct (as in an exhaust flue), turbulence of any scale will not be able to mix them more thoroughly.

Furthermore, sufficiently small particles that are entrained in a flowing fluid will follow the streamlines in the fluid flow. This occurs where the viscous forces of the fluid dominate the inertial forces of the particle. Known turbulent mixing regimes of the scale of the duct are many orders of magnitude larger than the particle. When viewed from the perspective of the particle, they are far from being chaotic but rather, are relatively smooth. Whilst there may be many changes of direction for a particle in its passage through a turbulent flow in a duct or through a standard mixing region, they are all relatively long range compared with the size or scale of the particle. Consequently, particles in a stream under conditions typical of industrial dust-laden flows follow more or less the same paths as their neighbouring particles, resulting in few interactions with the surrounding particles. At particle scale therefore, there are relatively few turbulence-generated interactions, and consequently, the known mixing processes achieve poor efficiency in agglomeration.

Systems intended to maximise the collision rate of very small pollution species which occupy a tiny proportion of the volume of the total fluid flow must cause them to move along different trajectories, and/or at different speeds, to each other, as often as possible. Additionally such differences in trajectory and/or speed must be brought to bear at the scale of the particle to have the most effect. Unfortunately, current design philosophies do not adequately address these criteria.

It is an aim of the present invention to provide method and apparatus for achieving improved interaction of particles in fluid flows.

It is another aim of this invention to provide a method of custom designing a formation to generate particle scale turbulence to cause interactions between particular types of particles in a fluid flow in a highly efficient manner.

SUMMARY OF THE INVENTION

This invention is based on the recognition that two particles of different mass and/or aerodynamic properties in a flowing fluid will respond differently to a turbulence eddy of a predetermined size in the fluid flow. More specifically, if the eddy is of a particular scale, the different particles will be entrained in the eddy to different extents, and will therefore follow different trajectories. Consequently, the likelihood of collision or interaction between the particles is increased.

Particles of similar mass and/or aerodynamic properties which are captured by, and entrained in, a turbulent eddy will follow roughly the same path and consequently do not impact with each other to any significant extent. A particle of larger mass and/or different aerodynamic property will not be entrained into the eddy, or will be entrained to a substantially lesser extent, and will therefore travel through the eddy on a different trajectory and be impacted by many more other particles entrained into the same eddy.

To improve the likelihood of collisions between two types of particles in a fluid flow, e.g. to promote their agglomeration or the adsorption of the smaller particle by the larger particle, a formation is designed to generate turbulence of such scale that different particles are entrained to significantly different extents.

In one broad form, the present invention provides a method of promoting interaction between at least two types of particles in a fluid stream by generating turbulent eddies in the fluid stream, characterised in that the eddies are of such size and/or intensity that the two types of particles are entrained in the eddies to significantly different extents.

In another form, the invention provides apparatus for promoting interaction between at least two types of particles in a fluid stream, comprising means for generating turbulent eddies in the fluid stream, characterised in that the eddies are of such size and/or intensity that the two types of particles are entrained in the eddies to significantly different extents.

Preferably, the turbulent eddies are of such size and/or intensity that one type of particle is substantially fully entrained while the other type of particle is not substantially entrained, to thereby maximize relative slip and the likelihood of interactions between the two type of particles.

In yet another broad faun, the invention provides a method of custom designing a formation for generating turbulence in a fluid stream to promote interaction between at least two types of particles in the fluid stream, comprising the steps of:

(i) identifying relevant characteristics of the two types of particles, (ii) performing a Stokes Number analysis to determine the optimal characteristic eddy size to cause one type of particle to have a significantly higher slip velocity than the other type of particle, and (iii) designing a formation to generate eddies in the fluid stream having the optimal size determined in step (ii) above.

The relevant characteristics of the two types of particles normally include the size and density of the particles.

The determination of the optimal characteristic eddy size may involve an iteration process.

As the standard equation for Stokes Number assumes that particles are spherical, an empirical "shape factor" may be applied to account for the shape of the particles.

For two given types of particles, e.g. a collector particle and a collected particle, the invention provides a method of custom designing a formation to generate turbulent eddies of such size and scale as to maximise the differential slip velocities of the two particles and thereby maximise the likelihood of interactions between the particles. Preferably, the eddies in the generated turbulence will be of such size that the slip velocity of the collector particle is maximised, while the slip velocity of the collected particle is minimised.

Throughout this specification where the context permits, the term "particle" is intended to mean a constituent of a flowing fluid that can be manipulated to effect its collision with another particle in the same fluid flow. The "particle" can be solid (e.g. a fly ash particle), liquid (e.g. a suspended water droplet) or gaseous (e.g. $SO_3$, Hg or $NO_x$ molecules). This invention can be applied to gas and solid particle interactions, gas and liquid droplet interactions, liquid and solid particle interactions, interactions between different sized droplets, and interactions between different sized particles. The different sized particles may be suspended in a gas or in a liquid, and the different sized droplets may be suspended in a gas.

The term "collector particle" is intended to mean the larger and/or heavier particle used to collide and/or interact with the "collected" or "collection" particle.

The term "interaction' is intended to mean that the particles collide or contact or come into sufficiently close proximity so as to result in their agglomeration, sorption, coagulation, catalysation or chemical reaction.

Additionally, the terms "slip" and "slip velocity" are used to describe the relative velocity between a particle and its surrounding fluid. Hence, if a particle is fully entrained in a turbulent flow, its slip velocity is zero. The more a particle's path diverges from that of its surrounding fluid, the greater will be its slip velocity. Therefore, in this context, if small particles follow the flow more closely than large ones, their slip velocity will be smaller and they will be said to have less "slip".

Typically, the fluid stream is a gas or air stream, and the particles of at least one type are pollutant particles of micron or sub-micron size. However, this invention is not limited to pollution control uses, and has wider application to other uses in which interaction between particles in a fluid stream is sought to be achieved in a highly efficient manner.

Turbulent eddies typically comprise vortex motions with a plurality of different sizes and shapes.

In one embodiment, a multiplicity of small, low intensity vortices are used to entrain fine (pollutant) particles and subject them to turbulent flow. One or more species of larger "collector" particles are introduced into the gas stream for removal of the pollutant particles The larger collector particles are either not entrained into the vortices, or are entrained to a much smaller extent, so that they follow different trajectories to the fine pollutant particles, resulting in a higher likelihood of contact and/or interaction between the pollutant particles and the larger species.

When the pollutant particles contact the larger species, they tend to adhere thereto or react therewith. The removal species may be a chemical, such as calcium, which reacts chemically with pollutant particles, (such as sulphur dioxide) to form a third compound (e.g. gypsum). Alternatively, the removal species of particles may remove the pollutant particles by absorption, or by adsorption (carbon particles adsorbing pollutant mercury particles), or the removal species of particles may simply remove the fine pollutants by agglomerating with the pollutants through impact adhesion. The larger or agglomerated particles are subsequently easier to remove from the gas stream using known methods.

Typically, a Stokes Number much less than 1 will ensure entrainment of the fine pollutant particles. The larger removal species of particles should have a Stokes Number much greater than 1 so that they are not entrained. In practice, the eddies or vortices generated in the gas stream are small, unlike the large scale turbulence of known mixers. Consequently, the formation typically comprises a multitude of components generating a multiplicity of small eddies or vortices.

Figure 2:
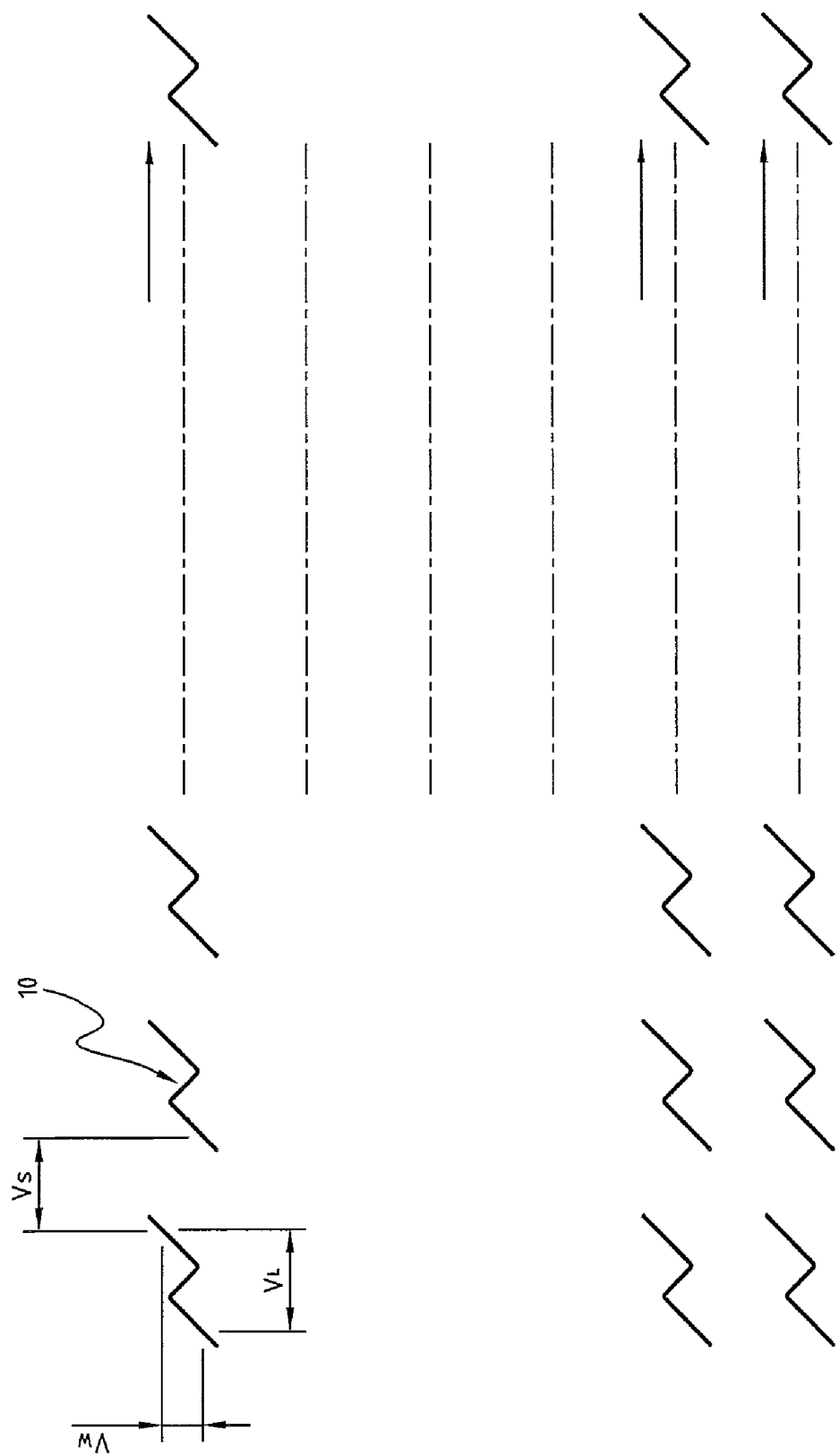

The multiplicity of small eddies or vortices entrain the (small) particles of interest and subject them to turbulent flow. Larger particles are not necessarily entrained by these small vortices, or are entrained to a much lesser extent. Relative movement between the small and large particles results in higher frequency of collisions between them, and more efficient removal of the fine (pollutant) particles by the larger (collector) particles.

The use of a multiplicity of small vortices is counterintuitive in flows where the particles are already well disbursed in a duct. Normally, it is desirable that the pressure drop in the gas stream be as low as possible. For this reason vanes are typically only used to maintain as uniform a distribution of particles as possible in a duct. Such vanes are therefore typically of a relatively large scale—only slightly smaller than the scale of the duct. For example, large-scale "turning vanes" may be used in a bend to prevent all of the particles from going to the outside of the bend and creating a non-uniform distribution after the bend.

Alternatively, known mixers are used when two different substances are not initially well distributed in a vessel or duct, to generate a homogenous mixture. Again, large-scale devices are typically used. They are not generally used to promote collisions between substances that are already well distributed in a duct. The present invention, on the other hand, uses many vortex generators which create small scale vortices to increase interactions between the fine (pollutant) particles and collector particles that are already sufficiently well distributed throughout the flow.

In order that the invention may be more fully understood and put into practice, an embodiment thereof will now be described, by way of example only, with reference to the accompanying drawings.

BRIEF DESCRIPTION OF THE DRAWINGS

FIG. 1 is a perspective view of a vane according to one embodiment of the invention.

FIG. 2 is a section plan view of an array of vanes of FIG. 1.

FIG. 3 is a section plan view of an array of vanes according to another embodiment of the invention.

FIG. 4 is a partial perspective view of an array of vanes according to another embodiment of the invention.

FIG. 5 is a partial perspective view of an array of vanes according to yet another embodiment of the invention.

FIG. 6 illustrates turbulent eddies formed by the array of FIG. 2.

FIG. 7 is a section plan view of a modified version of the array of vanes of FIG. 2.

DESCRIPTION OF PREFERRED EMBODIMENT

In a preferred embodiment, this invention involves the use of turbulent eddies to manipulate the relative trajectories of very small pollutant particles and larger collector particles carried by a flowing fluid, which is typically an exhaust gas stream from an industrial process, to increase the probability of the particles colliding or interacting to agglomerate, or otherwise react with each other, to form more easily removable particles. A formation is designed to provide turbulence of the required size and scale to cause the different species of particles to have substantially differential slip velocities.

The turbulence should be such that the Stokes Number (St) of the small pollutant particles is much less than 1 (St<<1), while the Stokes Number (St) of the larger collector particles is much greater than 1 (St>>1).

The Stokes number (St) is a theoretical measure of the ability of a particle to follow a turbulence streamline. The Stokes number is defined as the ratio of the particle response time to a fluid flow time and is characterised by:

$$St=\tau_p/\tau_f=\rho_p U d_p^2/18\,\mu L, \quad (1)$$

where; $\tau_p$ is the particle response time, $\tau_f$ is the characteristic flow time, $\rho_p$ is the particle density, U is the fluid velocity, $d_p$ is the particle diameter, $\mu$ is the fluid viscosity and L is the eddy dimension. Typically, for St<<1 a particle is able to respond fully to a turbulent eddy of scale L, and follows it closely. At the other extreme, where St>>1, a particle does not respond to turbulent motions of that scale at all and its trajectory is largely unaffected. In the intermediate range, for St≈1, particles respond partially to the fluid motions, but there is still a significant departure of the particle trajectory from the fluid motions.

When a Stokes analysis is performed for the common pollution species in the flue of, for example, an industrial coal fired boiler, it is found that for turbulence eddies at the scale of a typical duct (say 4 $m^2$) and velocity of the gas (8-16 m/sec), all particles of all commonly found sizes will respond fully to the turbulence eddies, i.e. St<<1 for all particles. Even for turbulence of a scale corresponding to the dimensions of duct height/width mixers, turning vanes, stiffeners etc (say 400 mm), the majority of particles below 100 μm will respond fully to the turbulence eddies. It is not until the turbulence scales are reduced significantly below this size that the particles exhibit a range of responses from St<<1 to St>>1 for sizes ranging from 0.1 μm up to 100 μm. Under such conditions, the trajectories of the large and small particles diverge from those of the flow to different extents, causing increased probability of collisions.

From the foregoing, it is evident that, if turbulent eddies are sized correctly, it is possible to increase the number of collisions between different sized constituents within the same fluid flow on the basis of their differing interaction with, and hence path through, a turbulent eddy of fixed size. Further, it is possible to tailor the dominant size of a turbulent eddy to maximise the interaction between specific constituents on the basis of their relative inertia and hence responses to the turbulent eddy. A suitable formation can then be designed to provide the desired combination of eddy sizes.

Vortex generators can be used to create the eddies. Vortex generators are generally known in the art, and need not be described in detail in this application. A common vortex generator is a vane. A formation comprising a plurality of vanes can be used to generate a multitude of eddies in the fluid stream.

In one embodiment, illustrated in FIGS. 1 and 2, an array of angle section vanes 10 is used to generate the vortices. A vane 10 is shown in FIG. 1 and comprises a strip of Z-shaped metal having protrusions or "teeth" 12 spaced along its length. The teeth 12 may be formed by spaced cut-outs 11 along the edges of the strip 10. The teeth 12 have a depth $T_d$ and the tooth pitch $T_p$.

The vanes 10 are arranged in an array comprising a plurality of parallel rows each extending in the direction of flow, each row containing a plurality of spaced vanes, orientated transversely to the fluid flow, as shown in the section view of FIG. 2. (The rows of vanes are normally mounted in planar frames which have been omitted for clarity). The body portions of the vanes 10 extend $V_l$ in the direction of fluid flow, and are spaced apart by a distance $V_s$. The body portions of the vanes 10 have a width $V_w$ in the direction transverse to the flow.

Turbulent eddies are formed in the wake of the folds and protrusions 12 of the vanes 10. The dominant sizes of eddies created by this design approximate the significant dimensions of the generator, and include the width of the vane $V_w$, the length of the vane $V_l$, the tooth depth $T_d$ and the tooth pitch $T_p$. The separation distance between successive vanes $V_s$ is selected so that the eddies may form fully in the inter vane region.

The combination of dimensions determines the combination of eddy sizes that are formed. The optimal range of eddy sizes is selected, and the vane design is optimized to achieve this within other constraints, such as pressure drop.

Although teeth are used on the illustrated vane 10 and the vanes are angled to the direction of fluid flow, other variations are possible because eddies will form in the wake of any planar cylindrical or other shaped body placed in the path of the fluid flow and the eddies formed will be approximately the same size as the obstructing vane.

Figure 3:
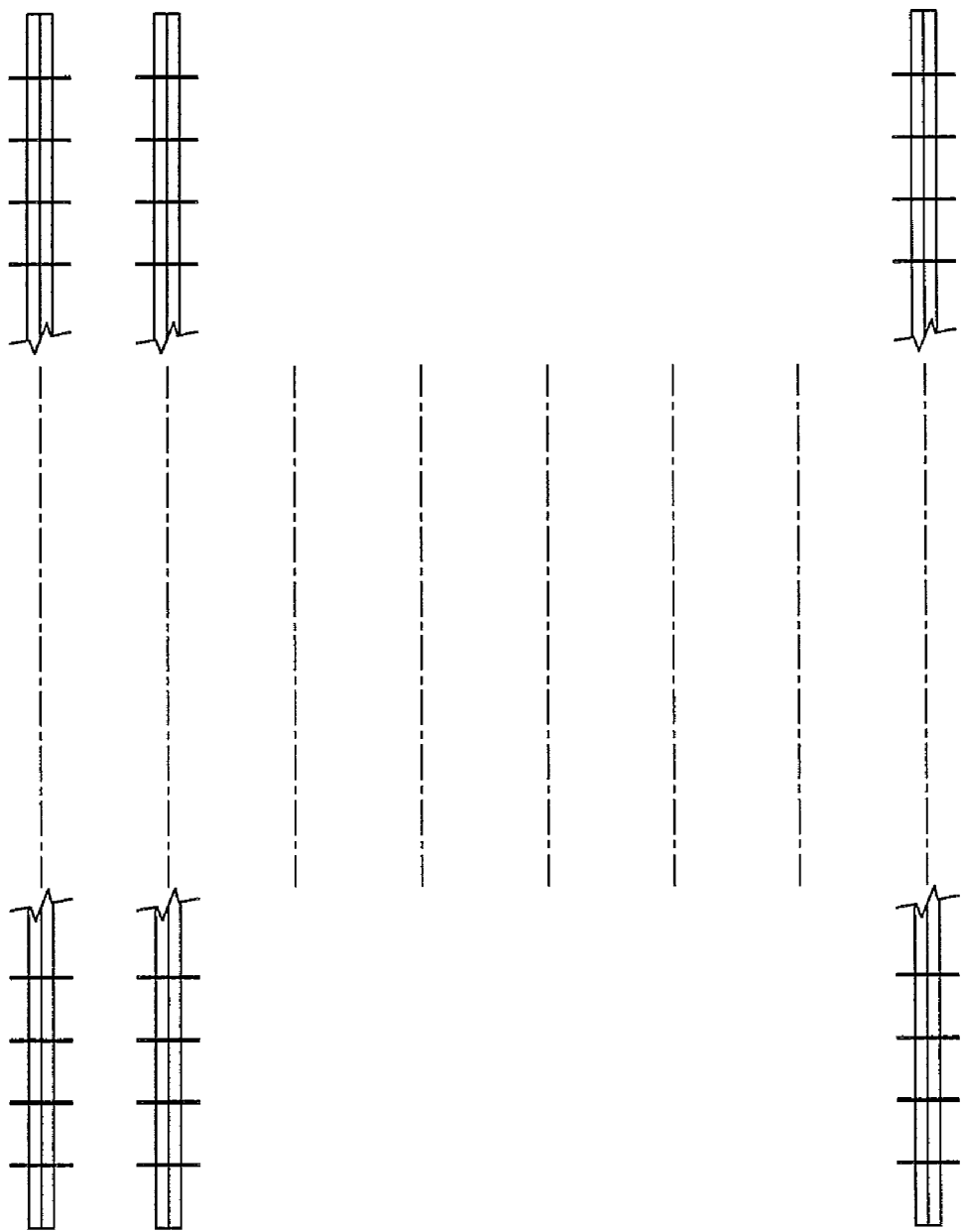
Figure 4:
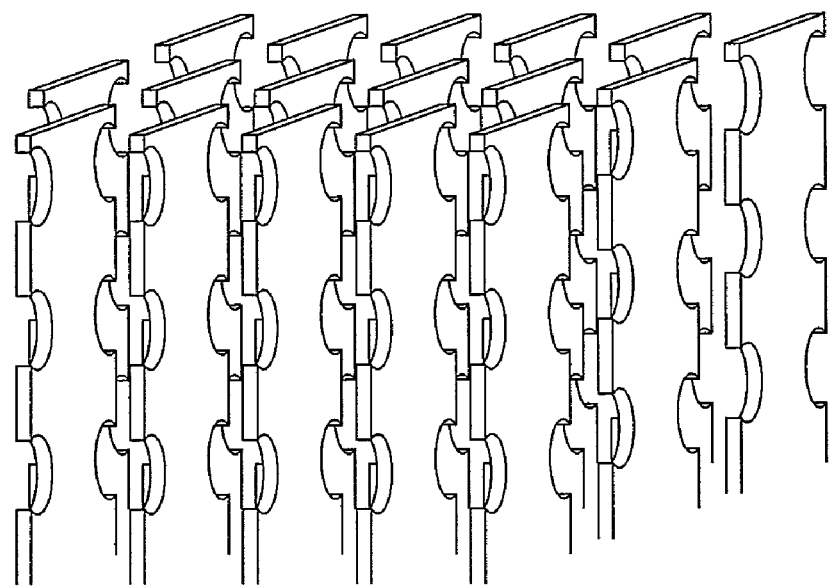
Figure 5:
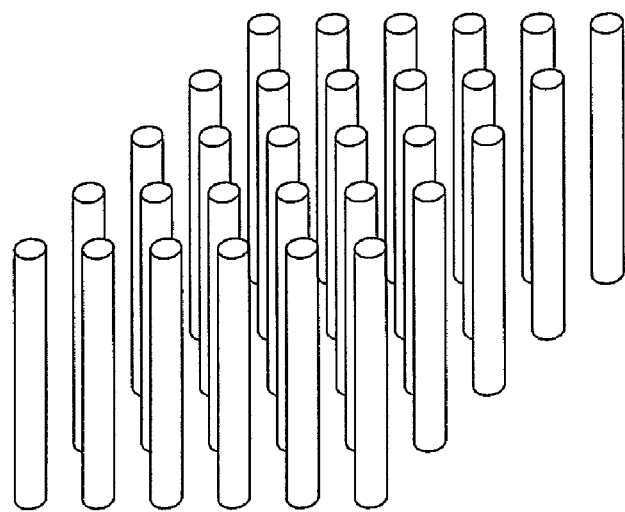
Figure 6:
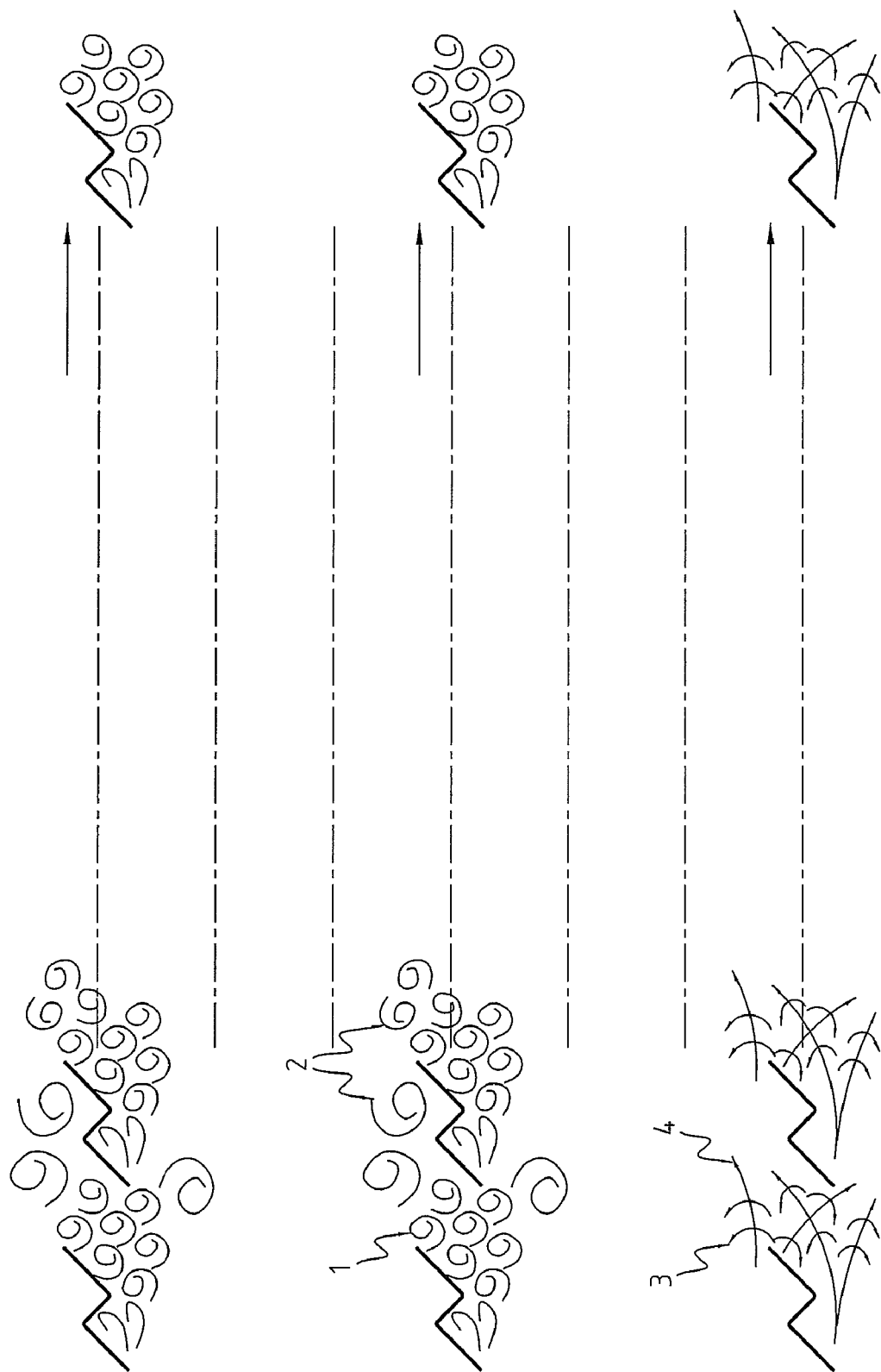

For example, as shown in FIG. 3, an array of flat strips mounted transversely to the fluid flow may be used. Alternatively, an array of flat strips with scalloped edges as shown in FIG. 4, or an array of round posts as shown in FIG. 5, may be used. An single transverse row of spaced wires or rods, orientated across the flow, may also be used.

The multiple small scale vortices or eddies generated by the array of vanes extend across the entire duct as it is preferable for the turbulence field to encompass the entire flow path. However, although the vanes may be mounted in a duct in which the subject air stream flows, it is to be noted that the invention does not require that vanes to be mounted in a duct or other conduit.

Thus, in one embodiment, a formation for causing turbulent flow of the desired size and scale in a fluid flow can be designed and constructed as follows:

1. Determine the size distribution and density of the particles to be agglomerated (both collector and collected particles), including the relative quantities of particles of each size.
2. Identify the distribution of size, density and shape and the number density of the particles to act as the "collector particle" (i.e. the particle that will have the greatest slip). These particles may be naturally present in the system (e.g. in the upper size fraction of particles in a pulverised fuel ash stream) or may be introduced (e.g. sorbent particles for mercury collection).
In certain systems, it is possible for the collector and collection particles to have significantly different densities and shapes. Variation in the slip characteristics of the collector and collected particles may be achieved by differences in density or shape, as well as by differences in size.
The collector particles will also be selected to ensure that there are sufficient numbers of them present to produce a significant number of collisions between collector and collection particles.
3. Perform a Stokes Number analysis of the system as defined in 2 (above) using equation (1) to determine the optimal characteristic eddy size (L) to cause the collector particles to have a significantly higher slip velocity than the collected particles. This would typically require the Stokes number for the collector particle to be at least an order of magnitude greater than that of the collected particle. In a preferred methodology, the Stokes number of spherical collector particles would be in the range $10^{-2}<St<10^2$. Note that once the critical particle sizes are determined, the Stokes Number analysis can be performed because St can be set (as St>>1 for high slip particles) and all other variables in the Stokes equation with the exception of L (the eddy size) are (or can be assumed to be) constant.

An iteration process may be used to determine the optimal characteristic eddy size (L). Namely, using the eddy size (L) as determined in step 3 (above), check St for the desired "collected particle" size (for low slip particles, St<<1). Using eddy size (L) as determined in step 3 (above) and St=1, check the intermediate particle response. Iterate these steps, adjusting the eddy size (L) to obtain the desired particle response. The optimum eddy size will normally be small, e.g. much less than 400 mm, and typically of the order of 10 mm, but will depend on the species of particles and their relevant characteristics.

4. Determine the required size of the dominant dimension of the vane(s), W, of the vortex generator to create an eddy of size (L), as determined in step 3 (above). In one methodology, W would be estimated to equal L. In another preferred methodology, the size of the vane would be determined by Stokes number similarity. This requires scaling the size of the vane to match as closely as possible the Stokes numbers of the collector and collected particles found to perform well in a different set of conditions, i.e. with different distribution(s) of particle size, density, shape and flow velocity and/or dynamic viscosity.

5. Design a vane with the appropriate shape and dimensions to generate eddies of the size determined in 4 above. A preferred shape of vane is shown in FIG. 1.

If necessary, an empirical "shape factor" could be applied to account for the shape of non-spherical particles.

There may be a range of sizes for each of the critical vane dimensions as dictated by the physical properties of the system, the dimensional requirements of manufacturing, and the engineering constraints of the apparatus. However, in general, the variables $V_w$, $V_l$, $V_s$, $T_p$ and $T_d$ will determine the size, shape, intensity and frequency of the turbulence created, which in turn will control the degree to which individual particles will slip and collide in the turbulence behind the vanes. The important design criteria are the size and spacing of the vanes.

In addition, the objective is to cause the collision of suspended particles for a useful purpose e.g. agglomeration, sorption, catalisation, condensation etc. Hence, sufficient particle interactions should occur that substantially all particles experience at least one (and preferably multiple) collision event/s while traversing the device. In a practical sense, this requires a multiplicity of vanes in the direction of flow as well as across the flow. A multiplicity of vanes across the flow ensures that there is no flow path through the device that is free of appropriately sized eddies, while a multiplicity of vanes in the direction of flow ensures the flow remains in the device for a sufficient time for a useful number of particle collisions to occur.

In a preferred embodiment, the device is long enough in the direction of flow that the flowing fluid is treated by it for at least 0.1 second. For a typical industrial flow of (say) 10 m/sec, this would require a device at least 1 m deep in the direction of flow.

Separation between subsequent vanes in the direction of flow should be such that the eddies created by a vane are reinforced by the eddy creating action of the vane immediately downstream, as illustrated in FIG. 6 in which vortices 1 created by a vane are reinforced at 2 by the next successive vane. FIG. 6 also illustrates the different trajectories of a low slip particle 3 and a high slip particle 4. In a preferred embodiment, the vanes are separated by a distance $V_s$ equivalent to the vane width $V_w$.

Alignment of the vanes is not critical and may be horizontal, vertical or at some angle between these two directions.

The present invention has the advantage that mixing devices can be designed to suit particular applications. More specifically, turbulence of a desired scale can be achieved, so that small pollutant particles are entrained into the turbulent eddies and vortices, whereas larger collector particles are entrained to a smaller or negligible degree). The resultant differential slip velocities and trajectories of the small pollutant particles and the larger removal particles result in more collisions between the two types of particles. Consequently, there is greater interaction between the particles (e.g impact adhesion, absorption, adsorption or chemical reaction), improving the efficiency of pollutant removal.

Conceptually, the invention involves generating turbulence of such a scale that the two species of interest are entrained to significantly differing extents, and is not limited to any particular apparatus and process. Optimum collision rates will occur for a system which maintains $St \ll 1$ for one species and $St \leq 1$ for the other species. The turbulence itself may be generated in any suitable manner, and is not limited to known vortex generators.

Although the invention has been described with particular reference to its application in pollution control, it can be used to design high efficiency mixers for other applications.

Further, although the invention has been described with particular reference to the mixing of particles in a gas stream, it also has application to mixing in other fluid flows, e.g. liquids.

Figure 7:
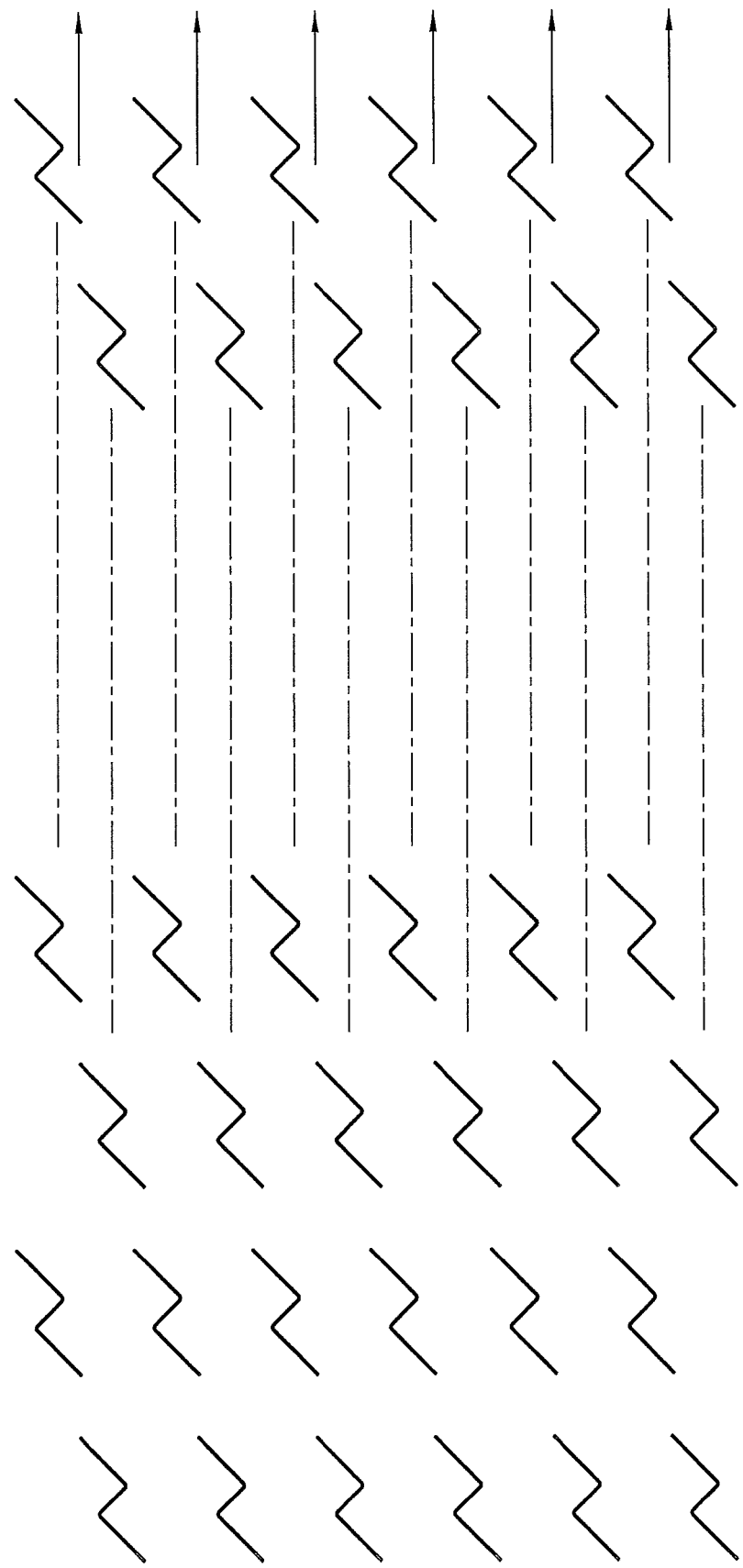

The vanes need not be mounted in a rectilinear array. As shown in FIG. 7, the vanes may be mounted in successive rows transverse to the direction of flow, with the vanes in each row being staggered across the flow path relative to vanes in the adjacent rows.

In a further embodiment of the invention, two or more turbulence generators are spaced successively along the flow path, generating progressively larger turbulence eddies to promote the impact of progressively larger particles. Such an arrangement accommodates agglomerates which are progressively increased in size along the flow path. This embodiment has potential application in mist eliminators and fine particle agglomerators, as well as in chemical interaction or catalisation processes in which successively larger constituents are targeted to enhance the process efficiency.

The invention claimed is:

1. A method of promoting interaction between at least two different type particles in a fluid stream, comprising:
    (a) providing a turbulent eddy generating formation in a duct;
    (b) causing a fluid stream to flow in the duct and interact with the formation whereupon the formation causes turbulent eddies to form in the fluid stream, said turbulent eddies causing the two different type particles to be entrained therein to significantly different extents whereupon interactions are caused between the two different type particles.

2. The method of claim 1, wherein the turbulent eddies cause the one type particle to be substantially fully entrained while the other type particle is not substantially entrained, whereupon relative slip between the two types of particles and the likelihood of interactions between the two types of particles in the turbulent eddies is maximized.

3. The method of claim 1, wherein the Stokes number for one type of particle is at least an order of magnitude greater than the Stokes number of the other type of particle.

4. The method of claim 3, wherein the Stokes number for at least one type of particle is in the range $10^{-2}$ to $10^2$.

5. The method of claim 1, wherein one type of particle is solid, liquid or gaseous, and the other type of particle is solid, liquid or gaseous.

6. The method of claim 1, wherein the formation includes a plurality of vane members in spaced relationship across the duct to generate a multiplicity of eddies.

7. The method of claim 6, wherein the spacing between the vane members is on the order of the width of the vane members.

8. The method of claim 6, wherein the formation further includes additional rows of vane members spaced across the duct to form an array of vane members, the additional rows being spaced longitudinally along the duct.

9. The method of claim 8, wherein the longitudinal spacing between the additional rows is on the order of 1 to 3 times the width of the vane members.

10. The method of claim 6, wherein there are sufficient additional rows of spaced vane members spaced longitudinally along the duct whereupon the time for the fluid stream to pass the array is at least 0.1 seconds.

11. A method of promoting interaction between at least two types of particles in a fluid stream comprising:
    (a) providing at least one array of vanes in an elongated duct in which a fluid stream, that includes first and second particles of different size, flows in the elongated direction of the duct, wherein:
       the vanes of each array extend in the elongated direction of the duct;
       a longitudinal axis of each vane is positioned transverse to the elongated direction of the duct; and
       the vanes of each array are configured to interact with the fluid stream and cause turbulent eddies to form in the fluid stream;
    and
    (b) causing the fluid stream to flow in the duct whereupon the turbulent eddies form in the fluid stream and cause interactions between the first particles which have trajectories that are largely unaffected by the turbulent eddies and second particles which have trajectories that are fully responsive to the turbulent eddies.

12. The method of claim 11, wherein Stokes numbers of the first particles and the second particles are much greater than 1 and much less than 1, respectively.

13. The method of claim 11, wherein the Stokes number for the first particles is at least an order of magnitude greater than the Stokes number for the second particles.

14. The method of claim 11, wherein:
    step (a) includes providing plural arrays of vanes that extend in the elongated direction of the duct in spaced relationship across the duct; and
    the plural arrays of vanes generate a multiplicity of eddies in different parts of the duct.

15. The method of claim 14, wherein the spacing between the vane members across the duct is on the order of the width of the vane members.

16. The method of claim 15, wherein the longitudinal spacing between the vane members in each array of vanes is between 1 to 3 times the width of the vane members.

17. The method of claim 11, wherein vanes of each array extend in the elongated direction of the duct a distance whereupon the fluid stream is treated by the array of vanes for at least 0.1 second.

* * * * *